(12) United States Patent
Stout (10) Patent No.: US 8,687,018 B1
(45) Date of Patent: Apr. 1, 2014

(54) COLLECTION AND CONFIRMATION OF PLACE METADATA AND GRAPHIC REPRESENTATIONS OF FIXED OBJECTS DISPLAYED IN A MAPPING SYSTEM

(75) Inventor: Bryce Stout, Boulder, CO (US)

(73) Assignee: Google Inc., Mountain View, CA (US)

( * ) Notice: Subject to any disclaimer, the term of this patent is extended or adjusted under 35 U.S.C. 154(b) by 277 days.

(21) Appl. No.: 13/243,890

(22) Filed: Sep. 23, 2011

(51) Int. Cl.
*G09G 5/00* (2006.01)

(52) U.S. Cl.
USPC .......................................................... 345/619

(58) Field of Classification Search
None
See application file for complete search history.

(56) References Cited

U.S. PATENT DOCUMENTS

| | | | |
|---|---|---|---|
| 6,714,201 B1 | 3/2004 | Grinstein et al. |
| 7,002,573 B2 | 2/2006 | Trotta et al. |
| 7,363,587 B2 | 4/2008 | Schaeffer et al. |
| 7,506,259 B1 | 3/2009 | Narayanaswami et al. |
| 7,511,718 B2 | 3/2009 | Subramanian et al. |
| 7,714,860 B2 | 5/2010 | Trotta et al. |
| 7,995,862 B2 | 8/2011 | Tao et al. |
| 2005/0131659 A1 | 6/2005 | Mei et al. |
| 2008/0062167 A1 | 3/2008 | Boggs et al. |
| 2009/0015585 A1 | 1/2009 | Klusza |
| 2011/0213480 A1 | 9/2011 | Zila et al. |

OTHER PUBLICATIONS

Thomas Jung, Immersive Redliner: Collaborative Design in Cyberspace, Oct. 20, 2000, Acadia.*
Wikipedia, Wikipedia: Edit filter, Nov. 6, 2010, http://en.wikipedia.org/wiki/Wikipedia:Edit_filter.*
Coeur et al., "A Wiki-Based Interface to Collaboratively Annotate 3D Models With Large Texts," EDULEARN11 Proceedings, pp. 6215-6224, Jul. 2011, abstract at http://library.iated.org/view/COEUR2011AWI, 1 page.
"Aveva ReviewShare 1.2: The most collaborative tool for 3D model review," http://www.vizio.cz/download/AVEVA_ReviewShare, 2 pages, Mar. 23, 2009.

* cited by examiner

*Primary Examiner* — Phi Hoang
*Assistant Examiner* — Mohammad H Akhavannik
(74) *Attorney, Agent, or Firm* — Marshall, Gerstein & Borun LLP; Andrew R. Smith (57) ABSTRACT

A computer-implemented system, method, or computer-readable medium storing a set of instructions for execution on a processor may edit and confirm data associated with geographic locations shared by models graphically representing physical objects corresponding to geographic locations displayed in a web-enabled mapping system. This may allow a user to edit or create a graphic component corresponding to a model and receive an edited or created model at the mapping system. The user may also change or supplement graphical and non-graphical data corresponding to the model's location in response to receiving the edited or created model at the mapping system, and determine if the user changed or supplemented the non-graphical data associated with the model. This changed data may also be reviewed against rules to determine if it should be associated with the model that is displayed in the mapping system.

26 Claims, 8 Drawing Sheets

COLLECTION AND CONFIRMATION OF PLACE METADATA AND GRAPHIC REPRESENTATIONS OF FIXED OBJECTS DISPLAYED IN A MAPPING SYSTEM

FIELD OF TECHNOLOGY

The present disclosure relates generally to a system and method for managing information and graphic representations of fixed objects used in computer-implemented mapping applications and more specifically to a system and a method for collecting and confirming data associated with those representations and well as the representations.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computer implemented mapping systems draw on vast data resources to render accurate and useful maps for their users. Graphic components displayed within the rendered maps may include one or more of buildings, streets, points of interest, and other physical objects having fixed geographic locations (e.g., an address, latitude and longitude coordinates, etc.) within the physical world. These graphic components may be edited within a computer-aided design system and added to the mapping system. For example, a computer-aided design system may allow a user to design a model of a building, a model of a structure, such as a public work of art, etc., that corresponds to an actual building or structure at a permanent geographic location. Some mapping systems may also allow public users to create and upload their own versions of the graphic components. Other users of the mapping application may then render these user-created graphic components within maps displayed on their computer devices.

In addition to the graphic components, mapping systems may also include textual and other information for the graphic components. For example, a building represented by a graphic component may include one or more business tenants. Information about those tenants may also be displayed in connection with the buildings in maps rendered by a mapping system. Therefore, in addition to maintaining a vast database of graphic components, mapping systems also maintain non-graphical information associated with those graphic components. As these businesses and building tenants change, information associated with them must be kept current. Therefore, maintenance of the graphic and other databases for a mapping system may be time consuming and complex.

SUMMARY

A computer-implemented method or a computer system or a computer-readable medium storing a set of instructions for execution on a processor may operate to edit and confirm graphical and non-graphical data associated with models that graphically represent physical objects displayed in a web-enabled mapping system. In some embodiments, the method, system, or computer-readable medium may allow a user to edit or create a graphic component corresponding to a model (e.g., a 3D model of a building or structure), allow a user to associate the model with a geographic location, receive a request to upload an edited or created model at a web server of a web-enabled mapping system, wherein the model is associated with the geographic location, allow the user to change or supplement the graphical and non-graphical data corresponding to the geographic location associated with the model in response to receiving the request to upload the edited or created model at the web server, and determine if the user changed or supplemented the graphical and non-graphical data. The method, system, or computer-readable medium may also store the model using the web server of the web-enabled mapping system. The stored model may include the edited or created graphic component and be logically associated with the changed or supplemented non-graphical data. Furthermore, the model may graphically represent a single or multi-unit building for display by a computing device that is using the mapping system and the non-graphical data may include information describing or relating to one or more tenants of the single or multi-unit building.

The graphic component of the method, system, or computer-readable medium may include shapes that are edited or created using functions of a user interface of a model editor module. The model editor module may execute on a user computing device and/or on a server.

Additionally, the method, system, or computer-readable medium described herein that allows the user to edit and confirm graphical and non-graphical data corresponding to the model may include retrieving the non-graphical data using the web server of the web-enabled mapping system. That non-graphical data may then be displayed in a user interface of a model editor module that is executing on a user computing device and/or on a server.

The method, system, or computer-readable medium may also review the changed or supplemented non-graphical data. For example, the changed or supplemented non-graphical data may be parsed and compared to a rule that describes a condition to either accept or reject the data. These rules may describe conditions corresponding to one or more of an amount of data that is changed, a number of similar changes, a time interval between changes, and a number of new listing data sets. In other embodiments, a human moderator of the data may review and verify the accuracy of the data.

The method, system, or computer-readable medium may also record a time stamp for a time that the graphical and/or non-graphical data is reviewed and allow the user to change or supplement the non-graphical data after a threshold time period from the timestamp is exceeded. The user may also consolidate or expand a number of models associated with the geographic location and corresponding to the non-graphical data.

The system may include several components for editing and confirming data associated with models that graphically represent physical objects displayed in a web-enabled mapping system. In some embodiments, the system may include a web-enabled mapping system including a storage component and a web server that communicates a model from the storage component to a user computing device, a model editor module executing on the user computing device to receive the model and allow a user to edit or create a graphic component corresponding to the model and to associate the model with a geographic location, a confirm non-graphical data user interface for displaying non-graphical data corresponding to the geographic location in response the user editing or creating the graphic component corresponding to the model and for allowing a user to change or supplement the non-graphical data, and a data review module for determining if the non-graphical data associated with the geographic location has been changed or supplemented and for comparing the changed or supplemented non-graphical data to a rule that describes a condition to either accept or reject the changed or supplemented non-graphical data. For example, the data review module may parse the changed or supplemented data and compare the parsed data to the rule. This rule may describe conditions corresponding to one or more of an amount of data changed, a number of similar changes, a time interval between changes, and a number of new listing data sets.

The data review module may also record a timestamp that indicates a time that the changed or supplemented non-graphical data is compared to the rule and allow the user to change or supplement the non-graphical data after a threshold time period from the timestamp is exceeded. The data review module may further allow consolidating or expanding a number of models associated with the geographic location and corresponding to the non-graphical data.

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

DETAILED DESCRIPTION

Generally speaking, a graphic component editor for a mapping system allows users to create and edit models and information corresponding to the models that may be rendered on a user's computing device. When users upload a model using a model editor, location data corresponding to the model may be used to return a list of potential places or businesses associated with that physical location. The user may then choose a place or set of places. Once chosen, the system may present known information about the location (e.g., a business or building address, phone number, hours of operation, business URL, etc). A user may then confirm some or all of the information as being current, flag the information as incorrect, and enter updated information. Updating or adding information associated with locations recognized by a mapping system may improve local data quality for the system.

Figure 1:
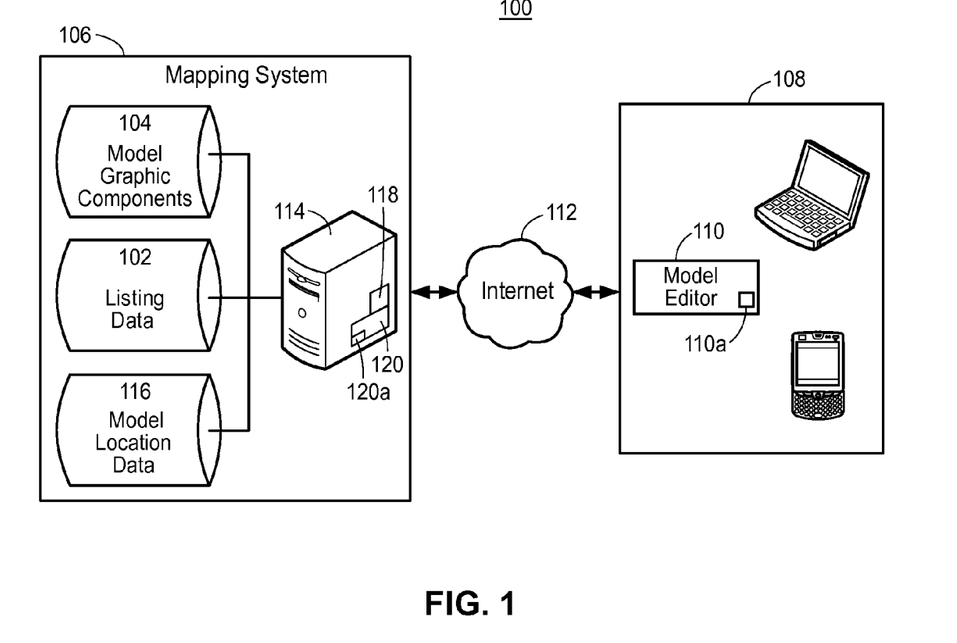
FIG. 1 is a block diagram of a computer-aided, modeling and design system that allows users to create and edit models that represent physical objects in a web-implemented mapping system, according to an embodiment.

FIG. 1 is a high-level block diagram that illustrates a system 100 for updating or adding data 101 corresponding to locations recognized by a mapping system 106. The system 100 may include a computing device 108 that is capable of executing a computer-aided, modeling and design system that allows users to create and edit models for the computer-implemented mapping system 106. In some embodiments, the device 108 executes instructions of a model editor application 110. The device may include a personal computer, smart phone, tablet computer, or other suitable computing device. The model editor application 110 may communicate with the mapping system 106 through the Internet 112 or other type of suitable network (e.g., local area network (LAN), a metropolitan area network (MAN), a wide area network (WAN), a mobile, a wired or wireless network, a private network, a virtual private network, etc.). A mapping system server 114 may send and receive model information and data 101 for the mapping system 106 such as computer-executable instructions and data associated with model graphic components 104, data 102 related to different geographic locations, model location data 116, and edits or additions to the data 102. The model graphic components 104, the data 102, and model location data 116 may be stored in various locations including separate repositories and physical locations. In some embodiments, the model editor application 110 may include computer-executable instructions to allow a user to edit or create a graphic component that corresponds to a geographic location. As part of the creation or editing process (e.g., when the user uploads the model to the mapping system 106), the model editor application 110 may execute instructions 118 to display a model editor user interface or dialog box 110a within a display of the computing device 108. The user interface 110a may allow a user to edit or add non-graphical information about a physical object represented by a particular model, and a data review module 120 may determine if the edited or added data is accurate. In another embodiment, the model editor application 110 may be implemented at least partially on the server 114.

Figure 2:
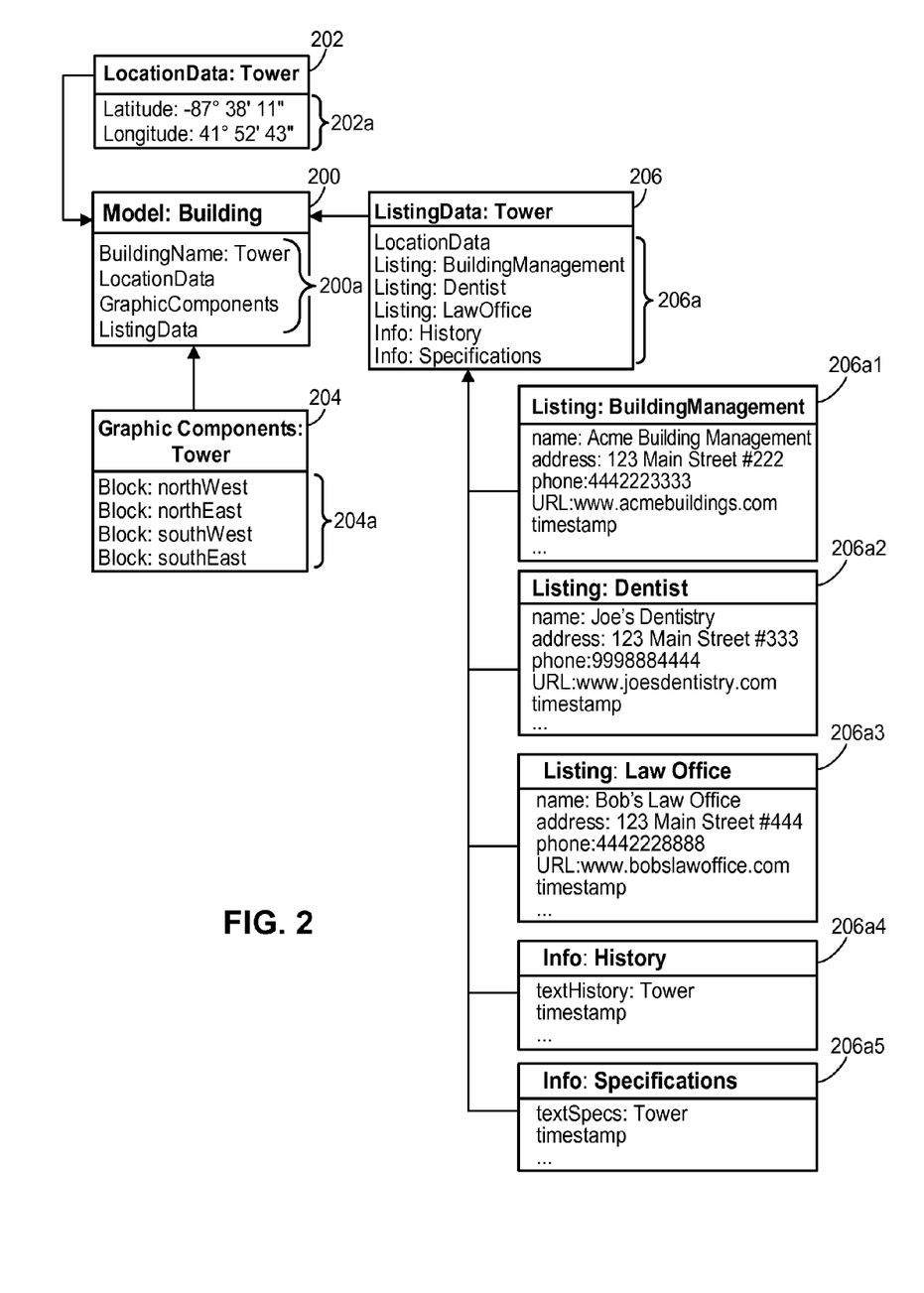
FIG. 2 is a block diagram of a model that may be used with the computer-aided, modeling and design system that allows users to create and edit models for the computer-implemented mapping system, according to an embodiment.

FIG. 2 illustrates one embodiment of a high-level block diagram for a model 200. A model 200 may include a plurality of attributes 200a, for example, a name and graphic components 204. The graphic components 204 may include shapes 204a and other items that graphically describe a visualization of the physical object that is represented by the model 200. In some embodiments, a model editor 110 and user interface 110a may allow a user to create or edit the shapes 204a that, in combination, create a visualization of the physical object represented by the model 200.

The model 200 may also be logically linked to one or more data resources. For example, the model 200 may be logically linked to various data resources 101 that include location data 202 and listing data 206. The location data 202 may include particular coordinates 202a that describe the specific geographic location of the physical object represented by the model 200. In some embodiments, the coordinates 202a include a latitude and longitude as determined by a global positioning system (GPS) or other system that is able to determine where the physical object is located. In another embodiment, the location data includes a street address (e.g., a number, a street, a zip code, etc.). Listing data 206 may include various groups of information 206a that describe characteristics of and/or information related to physical objects at respective locations described by the location data 202. In some embodiments, the information 206a includes listing information for tenants of a single or multi-unit building at a particular location, specifications describing the physical object at the location, history of the object, etc. For example, the information 206a may include several tenant listings 206a1, 206a2, and 206a3 that include data for building tenants as well as several information listings 206a4 and 206a5 that include data such as a history of the object or the physical specifications (e.g., height, width, age, weight, etc.) for the particular location.

When a user creates a model 200 and causes the system 100 to execute instructions that associate the model 200 with a location 202, the system 100 may execute other instructions to query a data repository 102 for listing data 206 associated with the same location 202. If listing information 206a associated with the same location is already in the database 102, the system 100 may execute another instruction to prompt the user to verify and/or supplement the information 206a. In some embodiments, the system 100 may prompt the user to verify the information 206a under certain conditions. For example, when a time stamp indicates that the information 206a has not been recently verified, the system 100 may prompt the user for verification. However, if a timestamp indicates that the information 206a has been recently verified, then the system 100 may not prompt the user. A threshold time period for determining the conditions under which the system 100 prompts the user may be set and, if exceeded, the system 100 may prompt the user. Of course, other conditions may be defined using a timestamp corresponding to a confirmation time for the information 206a. If listing information 206a associated with the same location is not already in the database 206, the system 100 may execute an instruction to prompt the user to add information 206a. In further embodiments, the system 100 may also prompt the user to verify if the graphic components accurately represent the physical object properly. For example, a building model may be uploaded to the system as representing a single building when it is actually made up of several, individual buildings (e.g., a compound or other area that may be represented by a single address but includes more than one building). Likewise, several building models may be uploaded to the system as representing multiple businesses when the group of listings and buildings is actually made up of only one building (e.g., a strip mall). Where multiple listings are associated with a single model, the system 100 may execute an instruction to prompt the user to consolidate the listings into fewer models, or to expand the listings into more models.

Figure 3A:
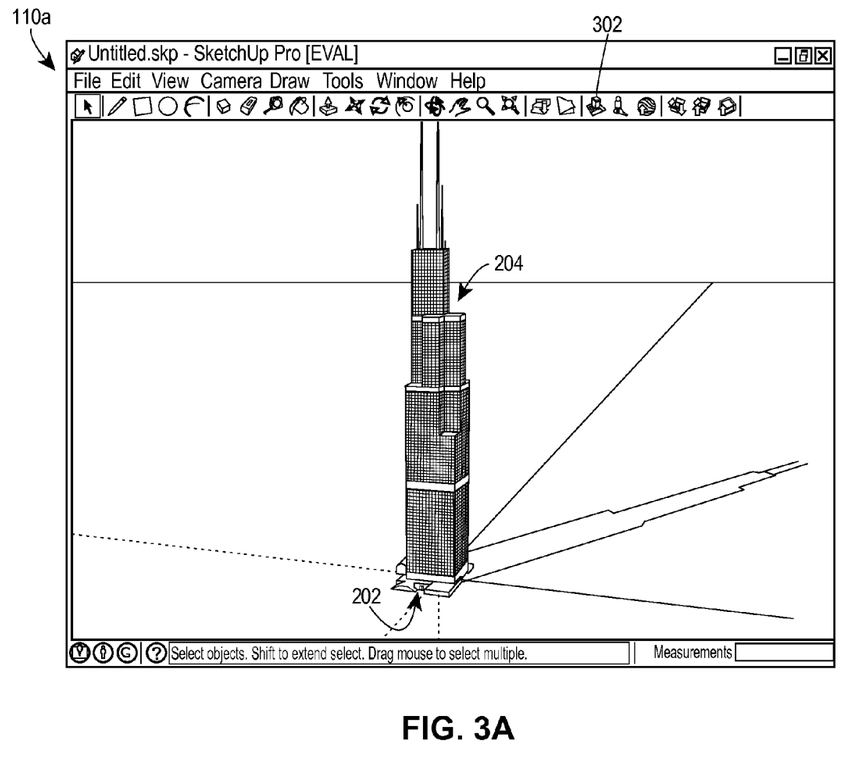
FIGS. 3A, 3B, 3C, and 3D are examples of graphical user interfaces of a computer-aided, modeling and design system that allows users to create and edit models for a computer-implemented mapping system and confirm listing data corresponding to the physical objects the models represent, according to an embodiment.

FIG. 3A illustrates one embodiment of a user interface 110a displaying graphic components 204 of a model 200 graphically representing a physical object (e.g., a building) having a fixed geographic location 202. Graphic components 104 of the model 202 may be created or edited within the user interface 110a. For example, graphic components 204 may include the visual elements of the model 200 such as blocks or other shapes that may be created or edited using various functions of the model editor 110 as initiated by one or more buttons 302 displayed within the user interface 110a.

Figure 3B:
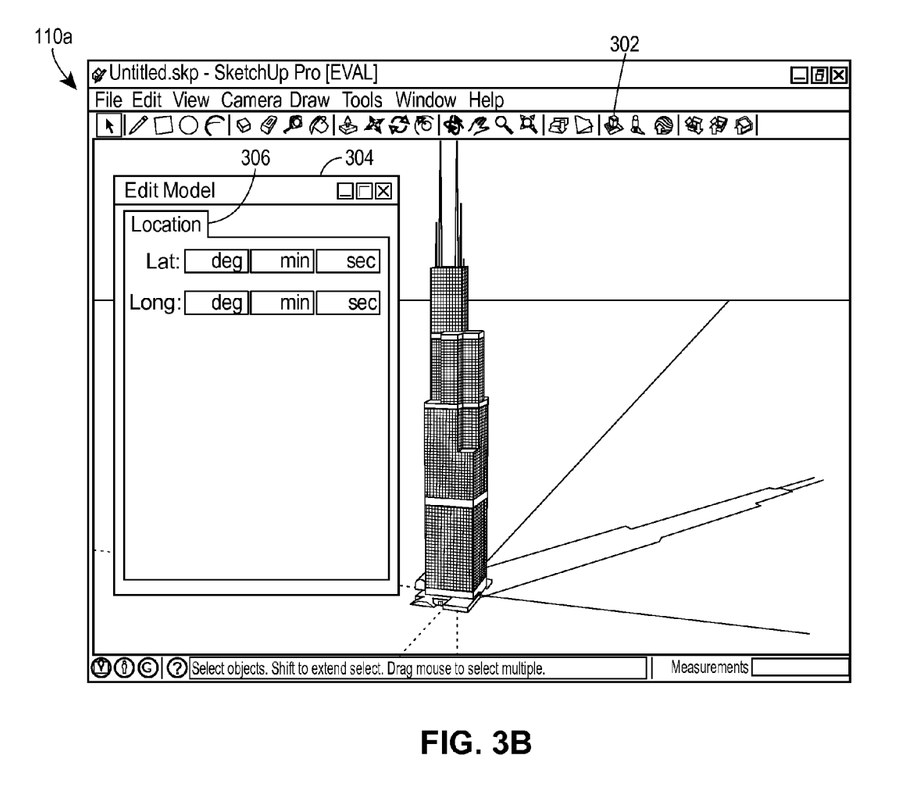

FIG. 3B illustrates one embodiment of a model user interface 304 within the user interface 110a. In some embodiments, selecting a button 302 may initiate the model user interface 304. The model user interface 304 may allow a user to create and edit various portions of a model 200. For example, the model user interface 304 may include a tab 306 to associate the model 200 with a particular geographic location 202 or to create or edit the geographic location 202 of the model, particular graphic components 204, etc.

Figure 3C:
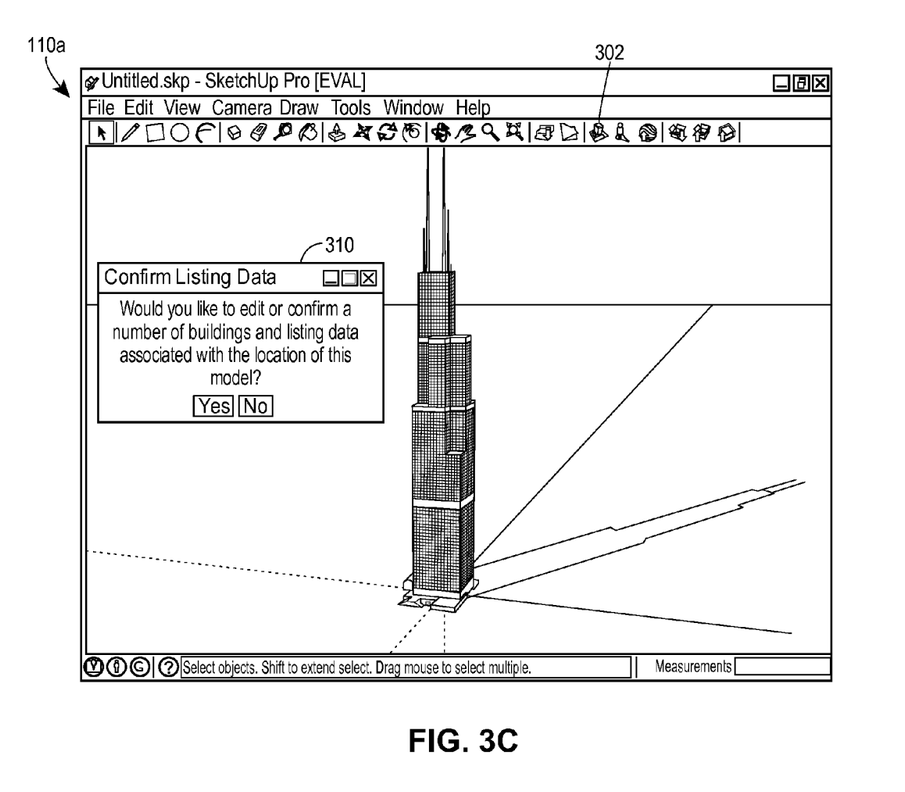
Figure 3D:
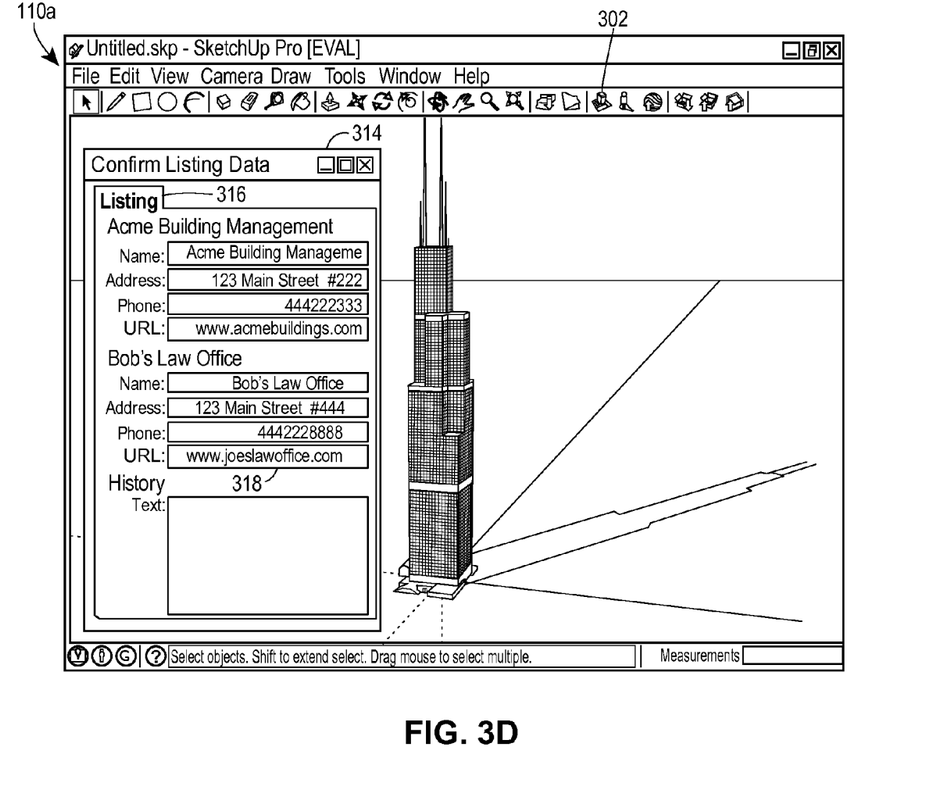

FIGS. 3C and 3D illustrate a user interface for creating or editing listing data 206 having a location that is the same as the location that is associated with the model 200. In some embodiments, the user interface 110a may display a dialog box 310 after a user creates or edits a model 200 and associates the model 200 with a particular location. For example, the model editor 110 may cause a computing device to execute instructions to display the dialog box 310 upon selection of an upload button 312 or other action associated with the model 200 using the model editor 110. Upon selecting "yes" from the dialog box 310, the model editor 110 may cause a computing device to execute instructions to display a confirm listing data user interface 314 within the user interface 110a. The confirm listing data user interface 314 may include sets of listing data 316 that are currently associated with the same location as the model 200 and stored within a model listing data repository 102. The listing data 316 may be retrieved from a listing database using the location 202 associated with the model.

A user may review the data 316 to determine whether to add or edit information. For example, if a user determines that a URL 318 currently associated with "Bob's Law Office" is incorrect, the user may change the URL 318. In some embodiments, the listing data 316 may then be forwarded to a data review module to be checked for accuracy and then saved to the listing database 102 (if accuracy is verified) or saved directly to the listing database 102 and flagged for later review.

Figure 4:
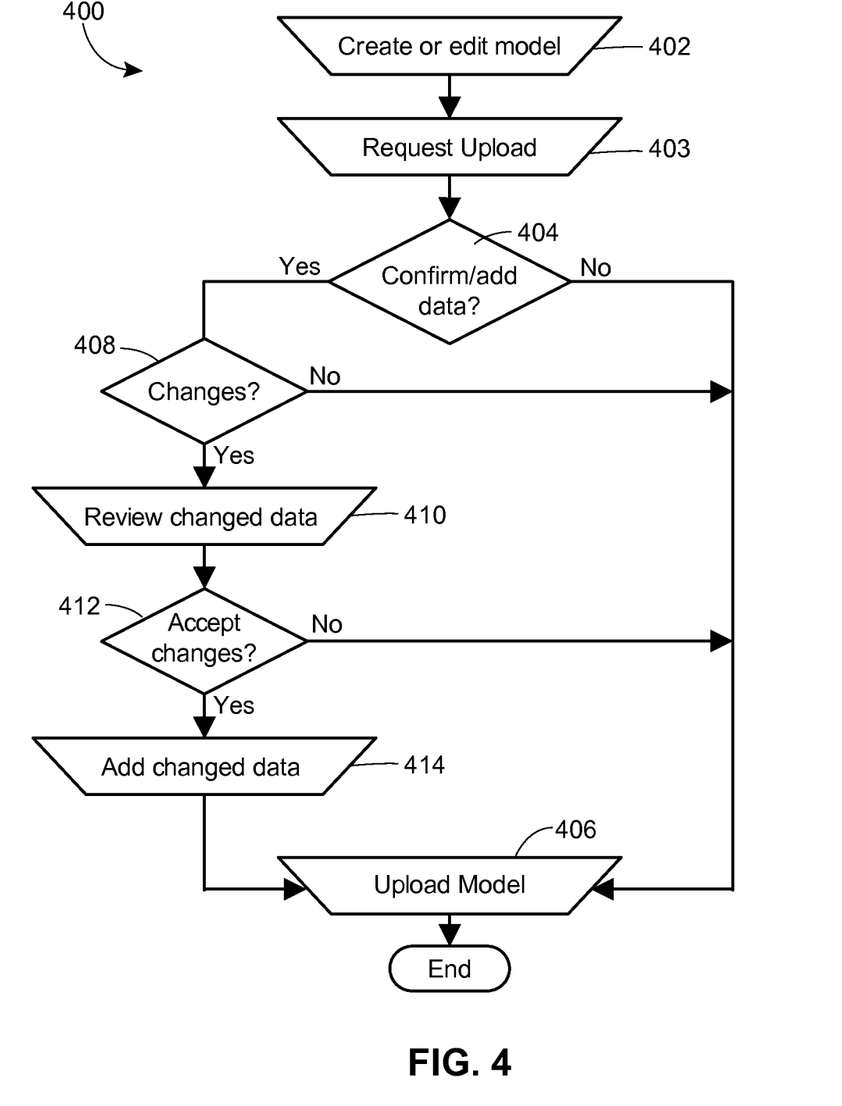
FIG. 4 is a flow diagram of an example method for using the computer-aided, modeling and design system to enter and edit information corresponding to physical entities represented by models that are displayed in a computer-implemented mapping system, according to an embodiment.

FIG. 4 is a flow diagram of an example method 400 for using a computer-aided, modeling and design system 110 to enter and/or update and/or verify non-graphical information associated with physical objects that correspond to models 200 that can be displayed in a computer-implemented mapping system 100. The method 400 may include one or more blocks, modules, functions or routines in the form of computer-executable instructions that are stored in a tangible computer-readable medium and executed using a processor of a computing device (e.g., a computing device of a mapping and model design system 100, as described herein). The method 400 may be included as part of any modules of a computing environment for a mapping and model design system 100, for example, or as part of a module that is external to such a system. For example, the method 400 may be part of a model editor 110 module or user interface 110a executing within a computing device 108 of a mapping and model design system 100. FIG. 4 will be described with reference to FIGS. 1, 2, and 3A-D for ease of explanation, but the method 400 can of course be utilized with other objects and user interfaces.

At block 402, a mapping and model design system 100 may execute an instruction to create or edit a model 200. In some embodiments, a button 302 or other element is selected from within a user interface 110a of a model editor application 110 to access and edit an existing model 200 or to create a new model. For example, selection of the button 302 may cause a computing device of the system 100 to execute instructions to launch a model user interface 304 of a 3D model editing system. Block 402 may include providing or editing a geographic location of a physical object that corresponds to the model 200. In some embodiments, block 402 may also include an instruction to establish a logical link between the model and location data 202.

At block 403, the mapping and model design system 100 may execute an instruction to request upload of the model 200 to the mapping system 106. Where the data repository 102 includes listing data 206 that is associated with the location data 202 and the model 200 includes the same location data 202, then, at block 404, the mapping and model design system 100 may execute an instruction to permit confirming and editing non-graphical information, such as the listing data 206, associated with the geographic location corresponding to the model 200. At block 404, the mapping and model design system 100 may also execute an instruction to permit consolidating multiple listings into fewer models or increasing a number of models associated with one or more listings. In some embodiments, block 403 includes an instruction to launch a dialog box 310 within a display of a computing system. The dialog box 310 may permit executing instructions to confirm and/or edit the non-graphical data and/or add non-graphical data, instructions to consolidate the listings into fewer models, expand the listings into more models, edit or add another model, etc., at block 404. In further embodiments, the dialog box 310 (or another suitable dialog box) permits executing instructions to upload a recently-edited or created model at block 406. For example, selecting "no" on the dialog box 310 causes the mapping and model design system 100 to execute instructions to save the model that was created or edited at block 402 in a data storage element of the mapping system 106 (e.g., the model graphic components repository 104). Each of the graphic components, listing data, and location data may be saved separately or together within the mapping system 106.

At block 408, the mapping and model design system 100 may execute an instruction to determine whether changes were made to the location data 202 associated with the model and/or the non-graphical data 206 associated with the geographic location corresponding to the model 200. In some embodiments, the system 100 may execute instructions to determine if the number of models associated with the listing data 206 and if any of the non-graphical data, e.g., listing data 206 was changed. For example, the system 100 may determine if the number of buildings for each listing changed, if new listing data was added and/or if listing data provided by the user is different than corresponding listing data stored in a listing database 102. If the buildings or non-graphical data has been changed, then the system may proceed to block 410. If the buildings or non-graphical data have not changed, then the system may proceed to block 406 to execute additional instructions, as described above.

At block 410, the mapping and model design system 100 may execute an instruction to review any changed non-graphical data corresponding to a particular location. In some embodiments, a data review module 120 may process the changed data to determine if the changes should be saved to the system 100. For example, the data review module 120 may include instructions to parse changed listing data 206, to determine if the changes conform to rules 120a that describe conditions or policies to accept or reject changes to the data. Rules for changed data listings may include a variety of conditions or policies to accept or reject the change such as an amount of data changed (e.g., too much of the data being changed may indicate the change should not be saved), a number of similar changes (e.g., a high number of identical or similar changes by other users may indicate the change should be accepted), a time interval between changes, a number of added listing data sets corresponding to tenants as compared to a size of the building, etc. In other embodiments, a human moderator may examine the changed data to determine if it should be saved. For example, where a large amount of information corresponding to a single listing or multiple listings is changed, then a human moderator may examine the changed data to determine if it should be rejected or accepted. Furthermore, a human moderator may be assigned a score indicating a level of confidence in the data. If a moderator's changes are later accepted or rejected, then a confidence score for that moderator may be raised or lowered accordingly.

At block 412, the system 100 may execute an instruction to accept or reject the changes based on the rules 120a. If the system 100 (including moderators, as described above) accepts the changes, then the system 100 may execute an instruction to add the changed data to the mapping system 106 (e.g., to the listing data repository 102). In some embodiments, the block 414 includes instructions to cause the changed data to be saved within one or more data storage elements. In further embodiments, block 414 includes instructions to associate time stamp information with the accepted data indicating when the data was confirmed. This time stamp may permit the system 100 to calculate several values for further confirmation functions. For example, the time stamp may allow the system to avoid asking a user to re-confirm data that has recently been confirmed as accurate. Furthermore, an expiration time may be set from the time stamp such that once a time limit expires, the data should be re-confirmed. The time stamp may also be used as an indication of confidence in the accuracy of the data (e.g., data that has not been confirmed in several years may not be as trustworthy as data that has only recently been confirmed). After saving the changed data and collecting time stamp data, the system may execute an instruction to proceed to block 406, as described above.

Figure 5:
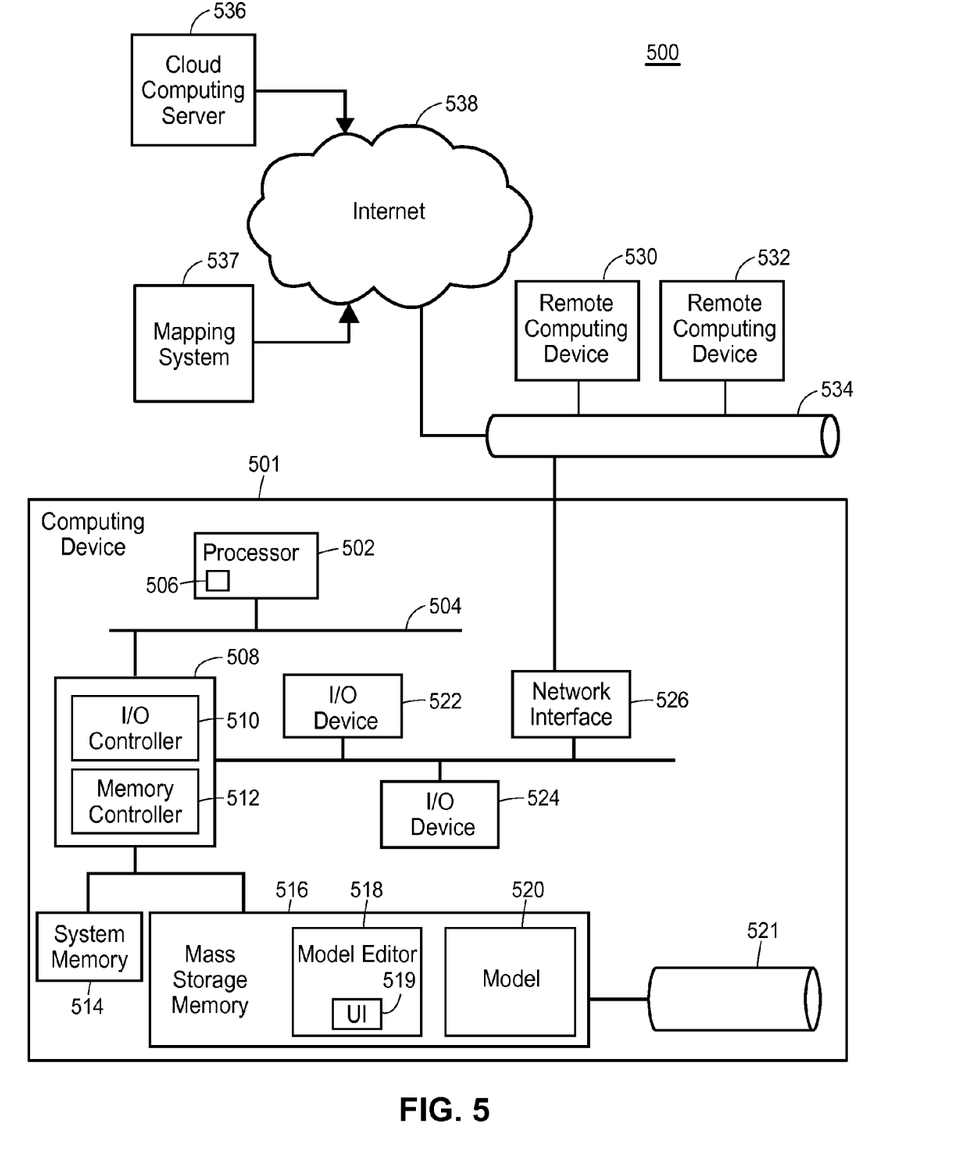
FIG. 5 is a block diagram of a computing environment that implements a mapping system that allows users to edit and upload information for models displayed using the mapping system, according to an embodiment.

FIG. 5 is a high-level block diagram that of an example computing environment 500 for a mapping and model design system 100 having a computing device 501 that may be used to implement a method 400 for updating non-graphical data corresponding to geographic locations. The computing device 501 may include a personal computer, tablet computer, smart phone, thin client, or other known type of computing device. As will be recognized by one skilled in the art, in light of the disclosure and teachings herein, other suitable types of computing devices that have different architectures can be used. Processor systems similar or identical to the computing environment 500 may be used to implement and execute the example mapping system 106, model editor module 110, model editor user interface 120a, review module 120, and review module rules 120a of FIG. 1, the model of FIG. 2, the user interfaces of FIGS. 3A-D, and the method of FIG. 4. Although the example computing environment 500 is described below as including a plurality of peripherals, interfaces, chips, memories, etc., one or more of those elements may be omitted from other example processor systems used to implement and execute the mapping and model design system 100. Also, other components may be added.

As shown in FIG. 5, the environment 500 includes a processor 502 that is coupled to an interconnection bus 504. The processor 502 includes a register set or register space 506, which is depicted in FIG. 5 as being entirely on-chip, but which could alternatively be located entirely or partially off-chip and directly coupled to the processor 502 via dedicated electrical connections and/or via the interconnection bus 504. The processor 502 may be any suitable processor, processing unit or microprocessor. Although not shown in FIG. 5, the environment 500 may be a multi-processor system and, thus, may include one or more additional processors that are identical or similar to the processor 502 and that are communicatively coupled to the interconnection bus 504.

The processor 502 of FIG. 5 is coupled to a chipset 508, which includes a memory controller 510 and a peripheral input/output (I/O) controller 512. As is well known, a chipset typically provides I/O and memory management functions as well as a plurality of general purpose and/or special purpose registers, timers, etc. that are accessible or used by one or more processors coupled to the chipset 508. The memory controller 510 performs functions that enable the processor 502 (or processors if there are multiple processors) to access a system memory 514 and a mass storage memory 516.

The system memory 514 may include any desired type of volatile and/or non-volatile memory such as, for example, static random access memory (SRAM), dynamic random access memory (DRAM), flash memory, read-only memory (ROM), etc. The mass storage memory 516 may include any desired type of mass storage device. For example, if the environment 500 is used to implement a mapping and model design system 100, a the mass storage memory 516 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, function, operation, procedure, routine, step, and method refer to computer program logic or computer executable instructions that provide the specified functionality to the computing device. Thus, a module, function, operation, procedure, routine, step, and method can be implemented in hardware, firmware, and/or software. In one embodiment, program modules and routines (e.g., the model editor 518, model editor user interface 519, and various models 520) are stored in mass storage memory 516, loaded into system memory 514, and executed by a processor 502 or can be provided from computer program products that are stored in tangible computer-readable storage mediums (e.g. RAM, hard disk, optical/magnetic media, etc.). Mass storage 516 may also include a database 521 storing a plurality of models 200 and a database interface module through which the model system 518, user interface 519, etc., may access the models.

The peripheral I/O controller 510 performs functions that enable the processor 502 to communicate with peripheral input/output (I/O) devices 522 and 524 and a network interface 526 via a peripheral I/O bus 528. The I/O devices 522 and 524 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 522 and 524 may be used with the model editor 518 and user interface 519 to add and change models as described herein. The network interface 528 may be, for example, an Ethernet device, an asynchronous transfer mode (ATM) device, an 802.11 wireless interface device, a DSL modem, a cable modem, a cellular modem, etc., that enables the computing device 501 to communicate with another computer system having at least the elements described in relation to the environment 500 and the mapping and model design system 100.

While the memory controller 512 and the I/O controller 510 are depicted in FIG. 5 as separate functional modules or blocks within the chipset 508, the functions performed by these blocks may be integrated within a single integrated circuit or may be implemented using two or more separate integrated circuits.

The environment 500 may also implement the mapping and model design system 100 on remote computing devices 530 and 532. The remote computing devices 530 and 532 may communicate with the computing device 501 over an Ethernet link 534. For example, the computing device 501 may receive models 200 created and edited by a mapping and model design system 100 executing on a remote computing device 530, 532. In other embodiments, the mapping system 106, model editor 518, user interfaces, etc., may be retrieved by the computing device 501 from a cloud computing server 536 via the Internet 538 and/or a mapping system 537. When using the cloud computing server 536, the retrieved model editor 518, models 520, etc., may be programmatically linked with the computing device 501. The model editor 518 and user interface 519 may be a Java® applet executing within a Java® Virtual Machine (JVM) environment resident in the computing device 501 or the remote computing devices 530, 532. The model editor 519 and user interface 519 may also be "plug-ins" adapted to execute in a web-browser located on the computing devices 501, 530, and 532.

Using the systems and procedures described above, a user can add or edit non-graphical data associated with geographic locations stored in a mapping system 106. With a model editor module and user interface, a user may enter or edit non-graphical information about a physical object that corresponds to a model that graphically represents the physical object. The information may then be stored and reviewed to ensure consistency with previous versions of information associated with the component.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the environment 500 may include but is not limited to any combination of a LAN, a MAN, a WAN, a mobile, a wired or wireless network, a private network, or a virtual private network. Moreover, while only three remote computing devices 530 and 532 are illustrated in FIG. 5 to simplify and clarify the description, it is understood that any number of client computers are supported and can be in communication within the environment 500.

Additionally, certain embodiments are described herein as including logic or a number of components, modules, blocks, or mechanisms. Modules and blocks may constitute either software (e.g., code embodied on a machine-readable medium or in a transmission signal, wherein the code is executed by a processor) or hardware. A hardware module or block is a tangible unit capable of performing certain operations and may be configured or arranged in a certain manner. In example embodiments, one or more computer systems (e.g., a standalone, client or server computer system) or one or more hardware modules or blocks of a computer system (e.g., a processor or a group of processors) may be configured by software (e.g., an application or application portion) as a hardware module that operates to perform certain operations as described herein.

In various embodiments, a hardware module or block may be implemented mechanically or electronically. For example, a hardware module or block may comprise dedicated circuitry or logic that is permanently configured (e.g., as a special-purpose processor, such as a field programmable gate array (FPGA) or an application-specific integrated circuit (ASIC)) to perform certain operations. A hardware module or block may also comprise programmable logic or circuitry (e.g., as encompassed within a general-purpose processor or other programmable processor) that is temporarily configured by software to perform certain operations. It will be appreciated that the decision to implement a hardware module or block mechanically, in dedicated and permanently configured circuitry, or in temporarily configured circuitry (e.g., configured by software) may be driven by cost and time considerations.

Accordingly, the term "hardware module or block" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules or blocks are temporarily configured (e.g., programmed), each of the hardware modules or blocks need not be configured or instantiated at any one instance in time. For example, where the hardware modules or blocks comprise a general-purpose processor configured using software, the general-purpose processor may be configured as respective different hardware modules or blocks at different times. Software may accordingly configure a processor, for example, to constitute a particular hardware module or block at one instance of time and to constitute a different hardware module or block at a different instance of time.

Hardware modules or blocks can provide information to, and receive information from, other hardware modules or blocks. Accordingly, the described hardware modules or blocks may be regarded as being communicatively coupled. Where multiple of such hardware modules or blocks exist contemporaneously, communications may be achieved through signal transmission (e.g., over appropriate circuits and buses) that connect the hardware modules or blocks. In embodiments in which multiple hardware modules or blocks are configured or instantiated at different times, communications between such hardware modules or blocks may be achieved, for example, through the storage and retrieval of information in memory structures to which the multiple hardware modules or blocks have access. For example, one hardware module or block may perform an operation and store the output of that operation in a memory device to which it is communicatively coupled. A further hardware module or block may then, at a later time, access the memory device to retrieve and process the stored output. Hardware modules or blocks may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or blocks that operate to perform one or more operations or functions. The modules or blocks referred to herein may, in some example embodiments, comprise processor-implemented modules or blocks.

Similarly, the methods or routines described herein may be at least partially processor-implemented. For example, at least some of the operations of a method may be performed by one or processors or processor-implemented hardware modules or blocks. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map editor system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and method for managing information associated with graphic representations of fixed objects used in computer-implemented mapping applications through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for editing and confirming data associated with geographic locations, the method comprising:
    allowing, using one or more processors, a user to edit or create a graphic component corresponding to a model;
    allowing, using one or more processors, the user to associate the model with a geographic location;
    receiving, using one or more processors, a request from the user to upload an edited or created model at a web server of a web-enabled mapping system, wherein the model is associated with the geographic location;
    providing for display, using one or more processors, a selectable option to review and replace existing non-graphical data corresponding to the geographic location in response to receiving the request to upload the model at the web server;
    receiving, using one or more processors, a selection to review and replace existing non-graphical data corresponding to the geographic location at the web server;
    receiving, using one or more processors, a user selection to replace existing non-graphical data corresponding to the geographic location associated with the model with different non-geographic data in response to receiving the selection; and
    replacing, using one or more processors, existing non-graphical data based at least in part on the received user selection to replace existing non-graphical data.

2. The method of claim 1, wherein the method further comprises storing, using one or more processors, the model using the web server of the web-enabled mapping system.

3. The method of claim 1, wherein the model graphically represents a single or multi-unit building for display by a computing device that is using the mapping system.

4. The method of claim 3, wherein the non-graphical data includes information describing one or more tenants of the single or multi-unit building.

5. The method of claim 1, wherein the graphic component includes shapes that are edited or created using functions of a model editor module user interface, wherein the model editor module is executing on a user computing device.

6. The method of claim 1, wherein receiving, using one or more processors, the user selection to replace existing non-graphical data includes retrieving, using one or more processors, the non-graphical data using the web server of the web-enabled mapping system and displaying, using one or more processors, the non-graphical data in a user interface of a model editor module that is executing on a user computing device.

7. The method of claim 1, wherein the method further comprises reviewing, using one or more processors, the replacement non-graphical data.

8. The method of claim 7, wherein reviewing, using one or more processors, the replacement non-graphical data includes parsing, using one or more processors, the replacement non-graphical data and comparing, using one or more processors, the parsed data to a rule that describes a condition to either accept or reject the replacement non-graphical data.

9. The method of claim 8, wherein the rules describe conditions corresponding to one or more of an amount of replaced data, a number of similar replacements, a time interval between replacements, and a number of new non-graphical data sets.

10. The method of claim 7, wherein reviewing, using one or more processors, the replacement non-graphical data includes recording, using one or more processors, a time stamp for a time that the replacement non-graphical data is reviewed and allowing, using one or more processors, the user to replace the non-graphical data corresponding to the geographic location associated with the model in response to receiving, using one or more processors, the request to upload the edited or created model at the web server includes allowing, using one or more processors, the user to replace the non-graphical data after a threshold time period from the timestamp is exceeded.

11. The method of claim 1, wherein receiving, using one or more processors, the user selection to replace existing non-graphical data corresponding to the geographic location associated with the model includes allowing, using one or more processors, the user to consolidate or expand a number of models associated with the geographic location and corresponding to the non-graphical data.

12. A non-transitory tangible computer-readable medium storing instructions, the instructions when executed by a processor cause the processor to:
    allow a user to edit or create a graphic component corresponding to a model that graphically represents a physical object displayed in a web-enabled mapping system;
    allow the user to associate the model with a geographic location;
    receive a request from the user to upload an edited or created model at a web server of the web-enabled mapping system, wherein the model is associated with the geographic location;
    provide, for display, a selectable option to review and replace existing non-graphical data corresponding to the geographic location in response to receiving the request to upload the model at the web server;

receive a selection to review and replace existing non-graphical data corresponding to the geographic location at the web server;

receive a user selection to replace existing non-graphical data corresponding to the geographic location associated with the model with different non-geographic data in response to receiving the selection;

replace existing non-graphical data based at least in part on the received user selection to replace existing non-graphical data; and verify the replacement non-graphical data by one or more of comparing the replacement non-graphical data to a rule that describes a condition to either accept or reject the replacement non-graphical data and allowing examination of the replacement non-graphical data;

wherein the model graphically represents a single or multi-unit building for display by a computing device that is using the web-enabled mapping system and the non-graphical data includes information describing one or more tenants of the single or multi-unit building.

13. The non-transitory computer readable medium storing instructions of claim 12, wherein the instructions, when executed by a processor, further cause the processor to store the model using the web server of the web-enabled mapping system if a replacement satisfies a rule or policy that describes a condition to accept the replacement non-graphical data.

14. The non-transitory computer readable medium storing instructions of claim 12, wherein the graphic component includes shapes that are edited or created using functions of a model editor module user interface, wherein the model editor module is executing on a user computing device.

15. The non-transitory computer readable medium storing instructions of claim 12, wherein the instructions to receive a user selection to replace existing non-graphical data include instructions to retrieve the non-graphical data using the web server of the web-enabled mapping system and display the non-graphical data in a user interface of a model editor module that is executing on a user computing device.

16. The non-transitory computer readable medium storing instructions of claim 12, wherein the instructions to verify the replacement non-graphical data includes instructions to parse the replacement data and compare the parsed data to the rule that describes the condition to either accept or reject the replacement non-graphical data.

17. The non-transitory computer readable medium storing instructions of claim 16, wherein the rule describes conditions corresponding to one or more of an amount of replaced data, a number of similar replacements, a time interval between replacements, and a number of new non-graphical data sets.

18. The non-transitory computer readable medium storing instructions of claim 17, wherein the instructions to verify the replacement non-graphical data further cause the processor to: a) record a time stamp that indicates a time that the replacement non-graphical data is reviewed and b) allow the user to replace the non-graphical data after a threshold time period from the timestamp is exceeded.

19. The non-transitory computer readable medium storing instructions of claim 17, wherein the instructions to verify the replacement non-graphical data further cause the processor to allow consolidating or expanding a number of models associated with the geographic location and corresponding to the non-graphical data.

20. The computer system of claim 16, wherein the model graphically represents a single or multi-unit building for display by the user computing device and the non-graphical data includes information describing one or more tenants of the single or multi-unit building.

21. The computer system of claim 16, wherein the web server is further configured for communicating the non-graphical data from the storage component to the confirm non-graphical data user interface.

22. The computer system of claim 16, wherein the web-enabled mapping system is further configured for storing the model in the storage component if the replacement satisfies the rule that describes the condition to accept the replacement non-graphical data, the stored model including the edited or created graphic component and the replacement non-graphical data.

23. The computer system of claim 16, wherein the data review module is further configured for parsing the replacement data and comparing the parsed data to the rule, wherein the rule describes conditions corresponding to one or more of an amount of replaced data, a number of similar replacements, a time interval between replacements, and a number of new non-graphical data sets.

24. The computer system of claim 23, wherein the data review module is further configured for recording a time stamp that indicates a time that the replacement non-graphical data is compared to the rule and allows the user to replace the non-graphical data after a threshold time period from the timestamp is exceeded.

25. The computer system of claim 23, wherein the data review module is further configured for allowing consolidating or expanding a number of models associated with the geographic location and corresponding to the non-graphical data.

26. A computer system for editing and confirming data associated with models that graphically represent physical objects displayed in a web-enabled mapping system, the system comprising:

a web-enabled mapping system including a storage component and a web server that communicates graphical data and non-graphical data from the storage component to a user computing device;

a model editor module executing on the user computing device to receive the graphical data and non-graphical data and allow the user to edit the graphical data and non-graphical data or create new graphical data and non-graphical data corresponding to a model and to associate the model with a geographic location;

a confirmation option user interface providing for display of a selectable option to review and replace existing non-graphical data corresponding to the geographic location in response to the user editing the graphical data or creating new graphical data corresponding to the model and for receiving a selection to review and replace existing non-graphical data corresponding to the geographic location;

a confirm non-graphical data user interface for displaying non-graphical data corresponding to the geographic location and for receiving a user selection to replace existing non-graphical data with different non-geographic data in response to receiving the selection; and a data review module for replacing existing non-graphical data based at least in part on the received user selection to replace existing non-graphical data and comparing the replacement non-graphical data to a rule that describes a condition or policy to either accept or reject the replacement non-graphical data.

* * * * *